United States Patent
Muccini et al.

(10) Patent No.: US 10,168,721 B2
(45) Date of Patent: Jan. 1, 2019

(54) CONTROLLING REDUNDANT POWER SUPPLIES IN AN INFORMATION HANDLING SYSTEM

(71) Applicant: DELL PRODUCTS, L.P., Round Rock, TX (US)

(72) Inventors: Mark A. Muccini, Georgetown, TX (US); Stuart A. Berke, Austin, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 502 days.

(21) Appl. No.: 14/929,456

(22) Filed: Nov. 2, 2015

(65) Prior Publication Data

US 2017/0123445 A1 May 4, 2017

(51) Int. Cl.
| | |
|---|---|
| *G05F 1/66* | (2006.01) |
| *G05B 15/02* | (2006.01) |
| *G06F 1/26* | (2006.01) |
| *H02M 1/32* | (2007.01) |
| *H02J 1/10* | (2006.01) |

(52) U.S. Cl.
CPC ............ *G05F 1/66* (2013.01); *G05B 15/02* (2013.01); *G06F 1/26* (2013.01); *H02J 1/10* (2013.01); *H02M 1/32* (2013.01); *H02M 2001/325* (2013.01)

(58) Field of Classification Search
None
See application file for complete search history.

(56) References Cited

U.S. PATENT DOCUMENTS

| 6,163,712 A * | 12/2000 | Winkler ................. H02H 9/001 323/908 |
|---|---|---|
| 7,400,067 B2 | 7/2008 | Atluri et al. |
| 7,531,918 B2 | 5/2009 | Atluri et al. |
| 2004/0201368 A1 | 10/2004 | Bobbitt et al. |
| 2005/0053228 A1* | 3/2005 | Mullins ................. H04M 1/745 379/399.01 |
| 2005/0141158 A1* | 6/2005 | Sae-Ueng ............... H02M 1/32 361/91.1 |
| 2007/0165429 A1* | 7/2007 | Selvaraju .......... H02M 3/33592 363/53 |

(Continued)

OTHER PUBLICATIONS

Columbia Gorge Community College, "7 SCR: Crowbar Circuit", Aug. 13, 2010, Youtube.com, whole video. (Year: 2010).*

*Primary Examiner* — Jason Lin
(74) *Attorney, Agent, or Firm* — Isidore PLLC (57) ABSTRACT

A method of detecting and disabling a failed power supply in a redundant power supply system is disclosed. The method includes detecting, via a first controller, an output voltage and an output current of a first power supply providing power to the redundant power supply system. The first controller determines if the output voltage is greater than a maximum output voltage threshold and in response to determining that the output voltage is greater than the maximum output voltage threshold, the first controller determines if the output current is equal to zero. In response to determining that the output current is not equal to zero and not less than a common share bus current, the first power supply is disabled such that the first power supply does not provide power to the power supply system.

18 Claims, 9 Drawing Sheets

(56) References Cited

U.S. PATENT DOCUMENTS

| | | | |
|---|---|---|---|
| 2009/0174386 A1 | 7/2009 | Popescu et al. | |
| 2010/0244800 A1* | 9/2010 | Nakamura | H02M 1/32 323/284 |
| 2011/0191618 A1 | 8/2011 | Berke et al. | |
| 2011/0234255 A1* | 9/2011 | Chobot | G01R 31/40 324/764.01 |
| 2013/0181729 A1* | 7/2013 | Egan | G01R 31/40 324/750.01 |
| 2013/0232362 A1* | 9/2013 | Zhou | G06F 1/263 713/323 |

* cited by examiner

CONTROLLING REDUNDANT POWER SUPPLIES IN AN INFORMATION HANDLING SYSTEM

BACKGROUND

1. Technical Field

The present disclosure generally relates to information handling systems and in particular to detecting and disabling a failed power supply in a redundant power supply configuration within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of redundant alternating current to direct current (AC-DC) or direct current to direct current (DC-DC) power supplies that provide regulated voltages to different loads. The load current may vary across a broad range from relatively high peak currents to very low stable currents. The AC-DC and DC-DC power supplies used in servers typically should be designed for a large range of server configurations and generally need to be designed to handle the full load of the server safely, and also need to be optimized for efficiency, size, and cost.

In many applications, reliability and/or availability of the information handling system is an important factor. Redundant power supplies provide an equivalent power back up when one or more power supplies discontinue operation. Multiple power supplies provide redundancy by being coupled to a common output bus that include isolation devices, such as a metal oxide semiconductor field effect transistor (MOSFET), so that failure of one of the power supplies does not affect the other power supplies or the common output bus. Although isolation devices provide redundancy and availability benefits, they also can have negative impacts, such as increased power dissipation. Devices such as a MOSFETs or transistors can dissipate several watts of power in the on or conduction states.

The function of the isolation device is to decouple the redundant power supplies from the common output bus. As a result, when a power supply fails the common output bus and/or other redundant power supplies are not affected. Without an isolation device, it is difficult to distinguish which power supply, amongst the redundant power supplies has failed. If an output over voltage or undervoltage condition occurs, it can be difficult to identify which power supply, among the multiple power supplies, is the cause of the problem.

BRIEF SUMMARY

Disclosed are a method of detecting and disabling a failed power supply in a redundant power supply system, a power supply system, and an information handling system (IHS) configured with the redundant power supply system.

According to one embodiment, the method of detecting and disabling a failed power supply in redundant power supply system includes detecting, via a first controller, an output voltage and an output current of a first power supply providing power to the redundant power supply system. The first controller determines if the output voltage is greater than a maximum output voltage threshold and, in response to determining that the output voltage is greater than the maximum output voltage threshold, the first controller determines if the output current is equal to zero. In response to determining that the output current is not equal to zero and not less than the common current share bus, the first power supply is disabled such that the first power supply does not provide power to the power supply system.

According to another embodiment, a power supply system comprises a first power supply including a first converter communicatively coupled to a first controller and a second power supply including a second converter communicatively coupled to a second controller. The first power supply and the second power supply are connected via a shared output bus in a redundant power supply configuration. The first power supply further includes a voltage detector that detects an output voltage of the first power supply and a current detector that detects an output current of the first power supply. A storage device is associated with the first controller and includes firmware that enables control of the first power supply. The firmware is executed by the first controller and configures the first controller to receive the output voltage and the output current and to determine if the output voltage is greater than a maximum output voltage threshold. In response to determining that the output voltage is greater than the maximum output voltage threshold, the first controller determines if the output current is equal to zero. In response to determining that the output current is not equal to zero and not less than the common current share bus, the first power supply is disabled such that the first power supply does not provide power to the power supply system.

According to an additional embodiment, an IHS comprises at least one processing node having at least one central processing unit (CPU). The IHS also includes a first power supply which includes a first converter that is communicatively coupled to a first controller and a second power supply which includes a second converter that is communicatively coupled to a second controller. The first power supply and the second power supply are connected via a shared output bus in a redundant power supply configuration. The first power supply further includes a voltage detector that detects an output voltage of the first power supply and a current detector that detects an output current of the first power supply. A storage device is associated with the first controller and includes firmware that enables control of the first power supply. The firmware is executed by the first controller and configures the first controller to receive the output voltage and the output current and to determine if the output voltage is greater than a maximum output voltage threshold. In response to determining that the output voltage is greater than the maximum output voltage threshold, the first controller determines if the output current is equal to zero. In response to determining that the output current is not equal to zero and not less than the common current share bus, the first power supply is disabled such that the first power supply does not provide power to the power supply system.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method of detecting and disabling a failed power supply in a redundant power supply system, a power supply system and an information handling system (IHS) configured with the power supply unit.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g. FIG. 1) and described herein may vary. For example, the illustrative components within IHS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

Figure 1:
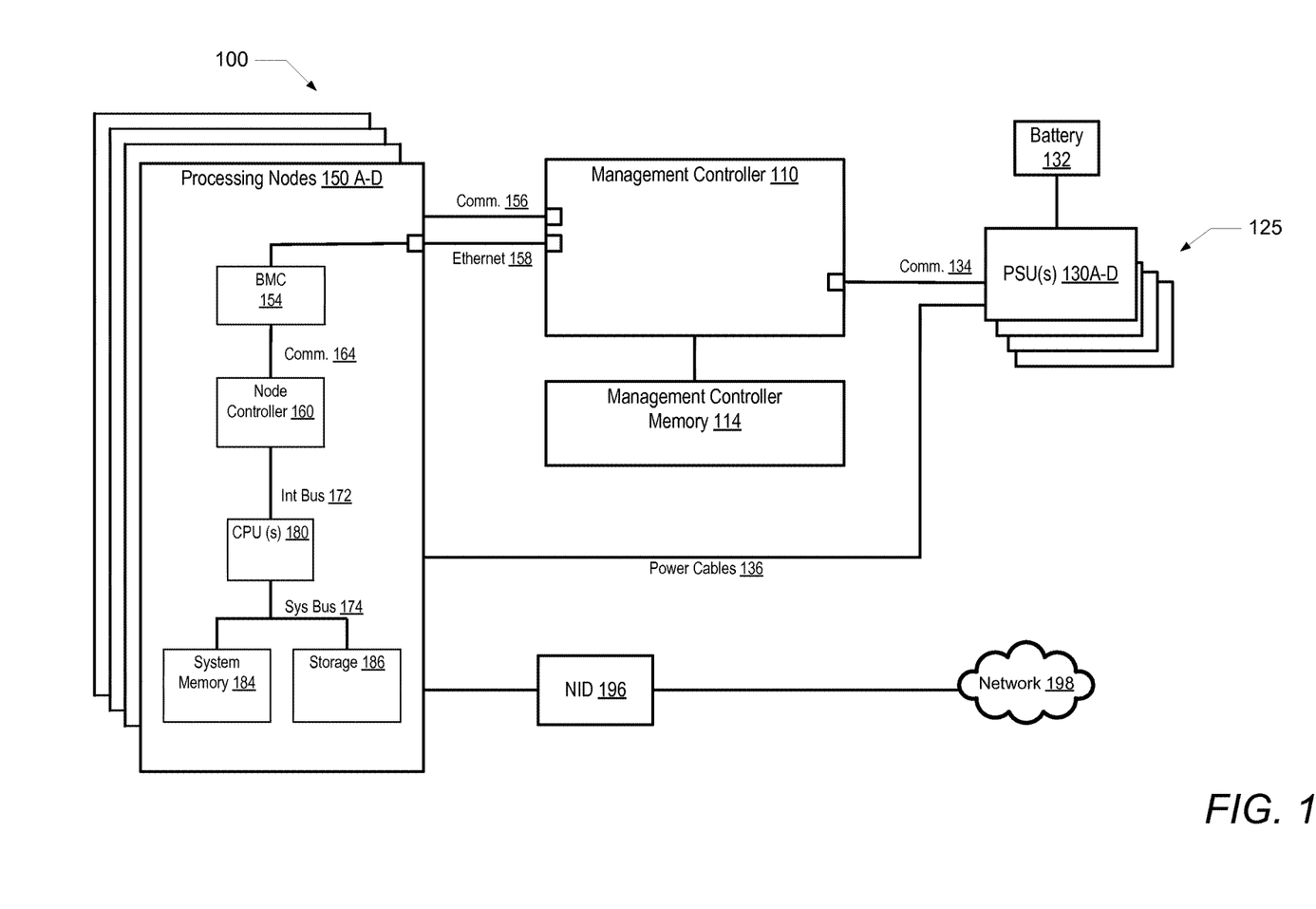
FIG. 1 is a block diagram illustration of an example information handling system (IHS), according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, IHS 100 comprises an arrangement of multiple computing or processing nodes along with power components. IHS 100 includes a management controller (MC) 110 that is communicatively coupled to processing nodes 150A-D via a communication bus 156 and an Ethernet bus or cable 158. The plurality of computing or processing nodes 150 are individually labeled as processing nodes A-D 150A-D. MC 110 is coupled to MC memory 114. MC memory 114 can be flash or other form of memory.

IHS 100 includes a power subsystem 125. Power subsystem 125 includes a plurality of power supply units (PSUs) 130A-D and a backup battery 132. Backup battery 132 provides power to IHS 100 in the event of a loss of AC power or the failure of one or more PSUs 130A-D. MC 110 is in communication with PSUs 130A-D via a communication bus 134. PSUs 130A-D supply power to each of the processing nodes and other components within IHS 100 that require power via either one or more bus bars or power cables 136. MC 110 can receive power supply data, capacity and settings from PSUs 130A-D via communication bus 134.

In one implementation, each of the processing nodes 150A-D has a board management controller (BMC) 154. BMC 154 is coupled to MC 110 via an Ethernet cable 158. Ethernet cable 158 carries data and signals between MC 110 and BMC 154. Specifically, according to at least one embodiment, MC 110 provides certain control and/or management signals to the processing nodes 150A-D via communication bus 156 and one or more select wires within Ethernet cable 158. In one embodiment, MC 110 can send and receive data signals at a relatively fast rate via the dedicated communication bus 156 or can send and receive data signals at a relatively slower rate via the Ethernet bus 158, depending on the desired data transfer rate.

Each of the processing nodes 150A-D includes a node controller 160 (collectively node controllers 160A-D). Node controller 160 is communicatively coupled to BMC 154 via communication bus 164. Node controller 160 is further coupled to one or more central processing units (CPU) 180 via an interface bus 172. The CPUs 180 support processing of data and information within each of the processing nodes. CPU 180 is communicatively coupled to system memory 184 and one more storage devices 186 via a system bus 174.

IHS 100 further comprises a network interface device (NID) 196 that is communicatively coupled to each of processing nodes 150A-D. NID 196 enables IHS 100 to communicate and/or interface with other devices, services, and components that are located external to IHS 100. These devices, services, and components can interface with IHS 100 via an external network, such as example network 198, using one or more communication protocols. In one embodiment, a customer provisioned system/platform comprises multiple devices located across a distributed network, and NID 196 enables IHS 100 to be connected to these other devices. Network 198 can be a local area network, wide area network, personal area network, and the like, and the connection to and/or between network and IHS 100 can be wired or wireless or a combination thereof. For purposes of discussion, network 198 is indicated as a single collective component for simplicity. However, it is appreciated that network 198 can comprise one or more direct connections to other devices as well as a more complex set of interconnections as can exist within a wide area network, such as the Internet.

Figure 2:
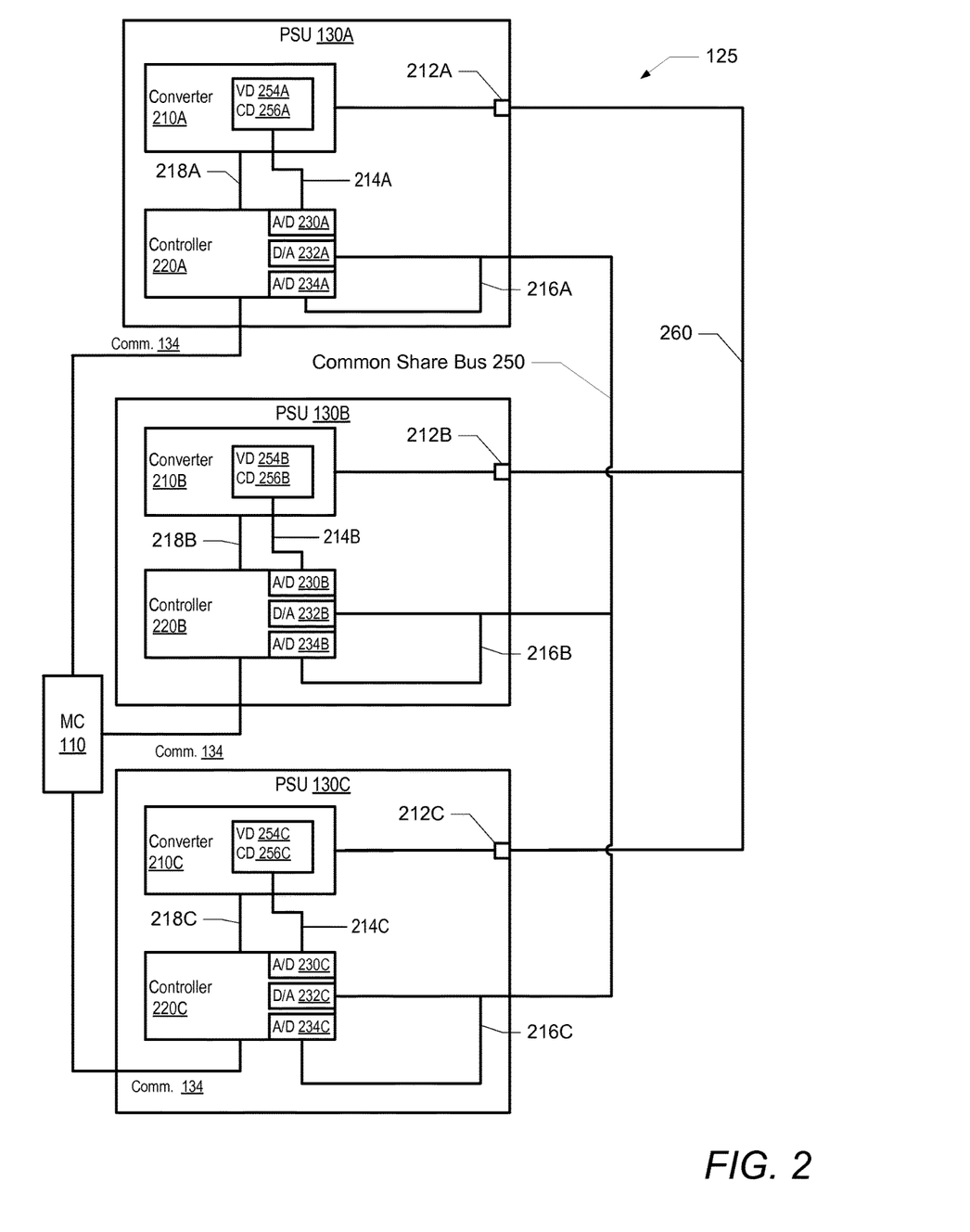
FIG. 2 is a block diagram illustrating details of a power management subsystem in an IHS, in accordance with one embodiment.

FIG. 2 illustrates further details of power subsystem 125 operating within IHS 100. Referring specifically to FIG. 2, power subsystem 125 comprises PSUs 130A, 130B and 130C that are communicatively coupled to MC 110 via communication bus 134. PSU 130A includes a converter 210A and a controller 220A, which can be a micro-controller in one or more embodiments. Converter 210A is a circuit such as an AC to DC or DC to DC converter that converts one voltage type and/or level to another. PSU 130A has an output terminal 212A that is coupled to the output of converter 210A and to the common output bus 260. Converter 210A includes a voltage detector (VD) 254A and a current detector (CD) 256A. VD 254A measures the output voltage of converter 210A and CD 256A measures the output current of converter 210A. Controller 220A includes analog to digital converters (A/D) 230A and 234A and digital to analog converter (D/A) 232A. D/A 232A is coupled to a common share bus 250. A/D 230A is coupled to both VD 254A and CD 256A via two or more circuit lines 214A. A/D 234A is coupled to common share bus 250 via circuit line 216A allowing controller 220A to sense the voltage on common share bus 250. Controller 220A is communicatively coupled to MC 110 via communication bus 134 and is communicatively coupled to converter 210A via internal bus 218A.

PSU 130B includes a converter 210B and a controller 220B. PSU 130B has an output terminal 212B that is coupled to the output of converter 210B and to the common output bus 260. Converter 210B includes VD 254B and CD 256B. VD 254B measures the output voltage of converter 210B, and CD 256B measures the output current of converter 210B. Controller 220B includes analog to digital converters (A/D) 230B and 234B and digital to analog converter (D/A) 232B. D/A 232B is coupled to common share bus 250. A/D 230B is coupled to both VD 254B and CD 256B via two or more circuit lines 214B. A/D 234B is coupled to common share bus 250 via circuit line 216B allowing controller 220B to sense the voltage on common share bus 250. Controller 220B is communicatively coupled to MC 110 via communication bus 134 and is communicatively coupled to converter 210B via internal bus 218B.

PSU 130C includes a converter 210C and a controller 220C. PSU 130C has an output terminal 212CB that is coupled to the output of converter 210C and to the common output bus 260. Converter 210C includes VD 254C and CD 256C. VD 254C measures the output voltage of converter 210C, and CD 256C measures the output current of converter 210C. Controller 220C includes analog to digital converters (A/D) 230C and 234C and digital to analog converter (D/A) 232C. D/A 232C is coupled to common share bus 250. A/D 230C is coupled to both VD 254C and CD 256C via two or more circuit lines 214C. A/D 234C is coupled to common share bus 250 via circuit line 216C allowing controller 220C to sense the voltage on common share bus 250. Controller 220C is communicatively coupled to MC 110 via communication bus 134 and is communicatively coupled to converter 210C via internal bus 218C.

It is noted that power subsystem 125 of FIG. 2 and specifically PSUs 130A, 130B and 130C do not contain any isolation devices, such as MOSFETs coupled between converters 210A, 210B and 210C and the common output bus 260. According to one aspect of the disclosure, power subsystem 125 does not contain isolation devices to decouple the redundant power supplies 130A-C from the common output bus 260. While controllers 220A-C are shown in FIG. 2, other devices such as a processor, central processing unit or discrete devices can be used.

Figure 3A:
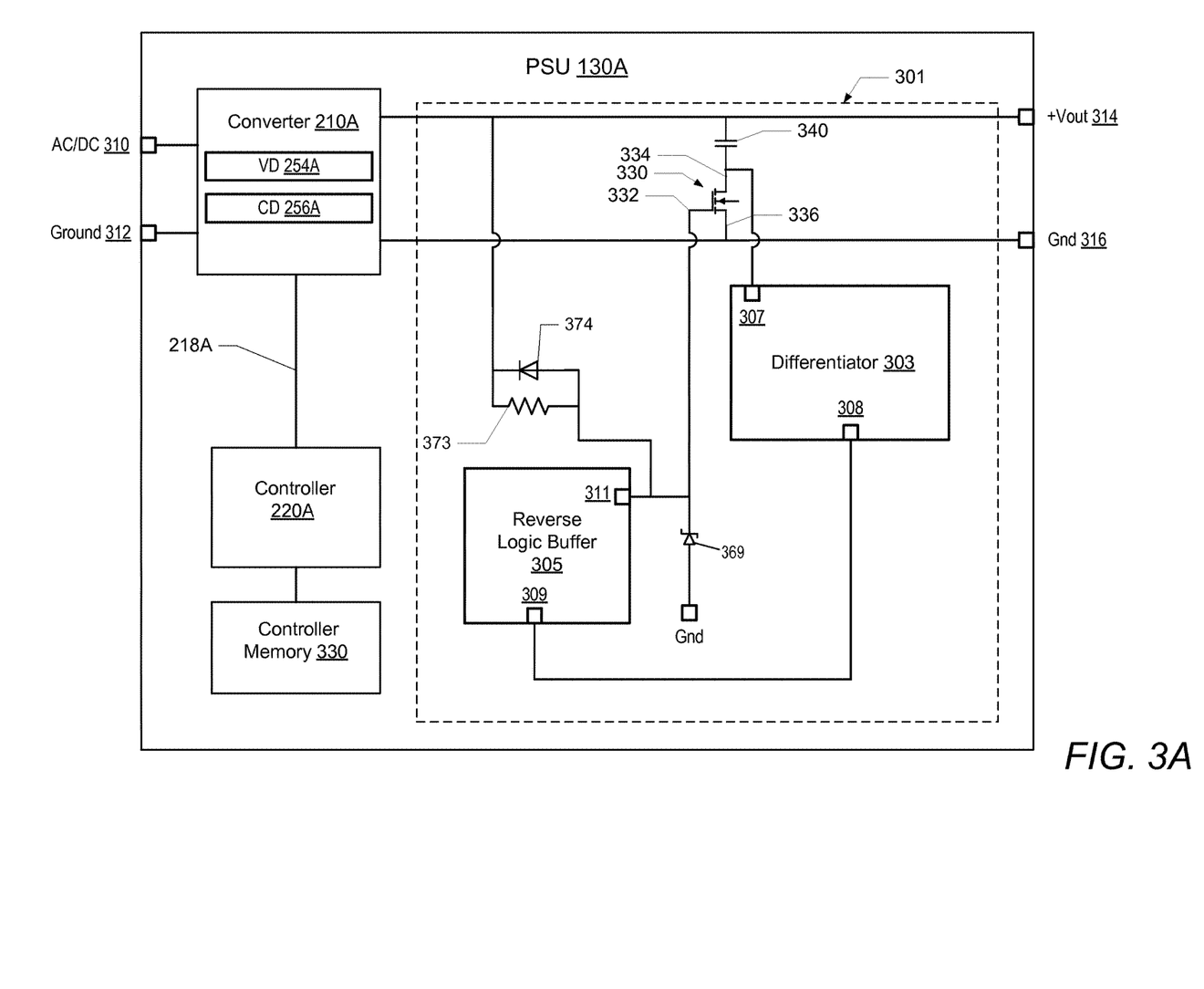
FIG. 3A is a block diagram illustrating details of a power supply unit, including an in-rush current protection circuit, in accordance with one embodiment.

Referring to FIG. 3A, further details of the PSUs and specifically PSU 130A are illustrated. PSU 130A includes converter 210A having an input ground terminal 312 and an AC/DC input power terminal 310. Converter 210A further has an output ground terminal 316 and +Vout terminal 314. The +Vout terminal 314 can supply current to IHS 100. Converter 210A includes VD 254A and CD 256A. Converter 210A is coupled to controller 220A by internal bus 218A. Controller 220A is coupled to controller memory 330. In one embodiment, Controller memory 330 can be a non-volatile or flash memory device.

PSU 130A further comprises an in-rush current protection circuit (ICPC) 301, which is coupled to converter 210A. ICPC 301 limits in-rush current to PSU 130A to avoid disruption of the common output bus 260 (FIG. 2) and prevent damage to components of PSU 130A (e.g. bulk capacitor 340) when the PSU is hot swapped or plugged into an active common output bus 260 (FIG. 2). ICPC 302 includes a MOSFET 330, a differentiator 303, and a reverse logic buffer 305. MOSFET 330 has a gate 332, a source 336 and a drain 334. Gate 332 is coupled to terminal 311 of reverse logic buffer 305. Source 336 is coupled to ground 316, and drain 334 is coupled to one end of capacitor 340. The other end of capacitor 340 is coupled to +Vout terminal 314.

In one embodiment, differentiator 303 and reverse logic buffer 305 can be digital circuits. Differentiator 303 includes a terminal 307 that is coupled to the junction of drain 334 and capacitor 340 and a terminal 308 that is coupled to terminal 309 of reverse logic buffer 305. A zener diode 369 is coupled between terminal 311 and ground. Terminal 311 is further coupled to the parallel combination of resistor 373 and the anode of diode 374. Resistor 373 and the cathode of diode 374 are coupled to +Vout 314. In another embodiment, resistor 373 and the cathode of diode 374 can be coupled to controller 220A.

When PSU 130A is connected to or plugged into an active power subsystem 125 of IHS 100 which is already powered up, there will be a large in-rush current into capacitor 340. ICPC 301 prevents damage due to the in-rush current. During operation, the output voltage of the differentiator 303 at terminal 308 is proportional to the current flowing through capacitor 340. If the in-rush current goes beyond a reference value, the output of differentiator 303 causes reverse logic buffer 305 to pull the gate voltage of MOSFET 330 down and increases the impedance of MOSFET 330. Because the MOSFET impedance is in series with the capacitor 340, the in-rush current will be reduced. The differentiator 305 controls the gate 332 of MOSFET 330. If the in-rush current is lower than a reference value, the output voltage of differentiator 303 will be too low, allowing the gate voltage of MOSFET 330 to increase and the in-rush current to increase.

Figure 3B:
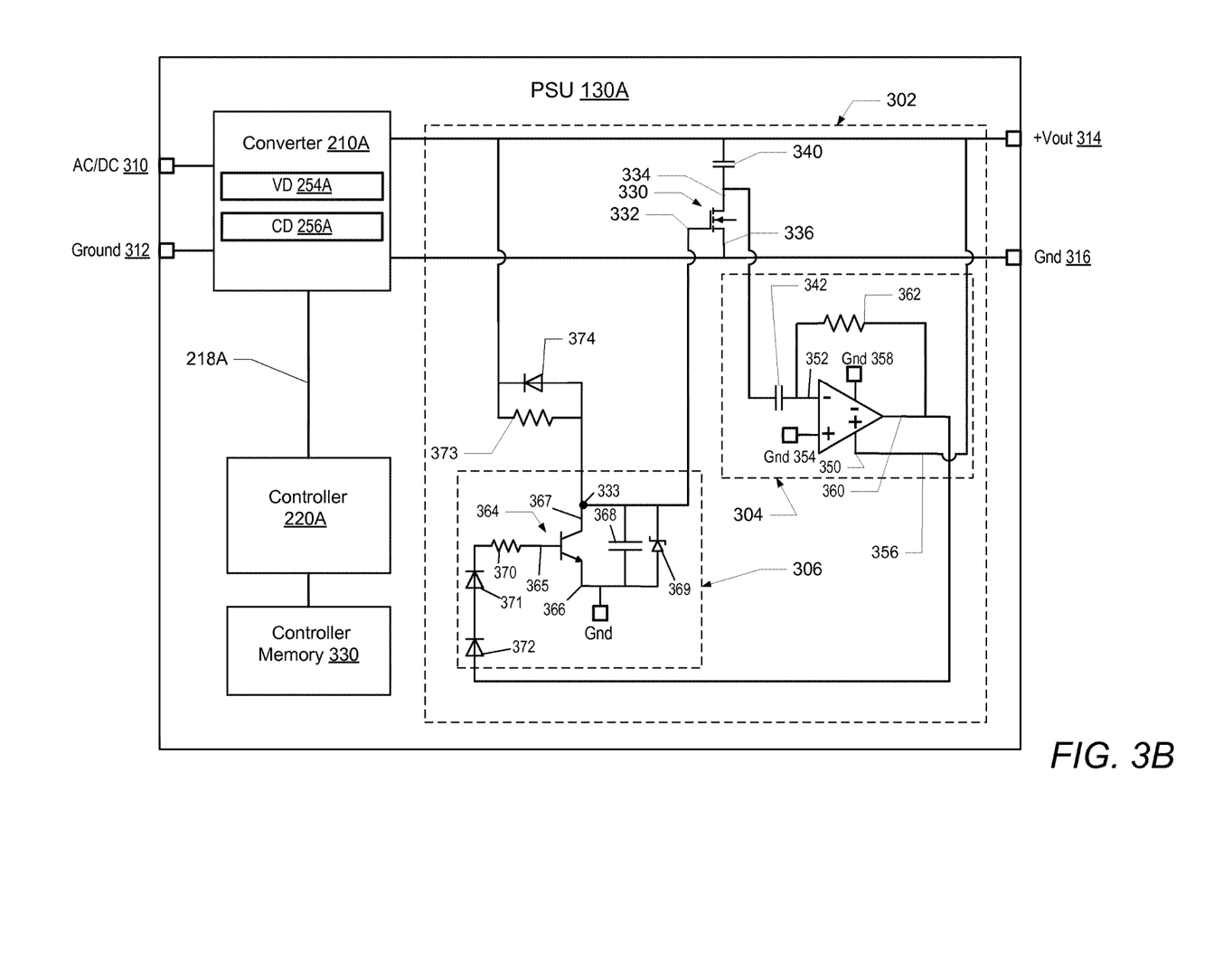
FIG. 3B is a block diagram illustrating details of a power supply unit, including an additional embodiment of an in-rush current protection circuit, in accordance with one embodiment.

Referring to FIG. 3B, another embodiment of PSU 130A is illustrated. PSU 130A includes converter 210A having an input ground terminal 312 and an AC/DC input power terminal 310. Converter 210A further has an output ground terminal 316 and +Vout terminal 314. The +Vout terminal 314 can supply current to IHS 100. Converter 210A includes VD 254A and CD 256A. Converter 210A is coupled to controller 220A by internal bus 218A. Controller 220A is coupled to controller memory 330. In one embodiment, controller memory 330 can be a non-volatile or flash memory device.

PSU 130A further comprises an in-rush current protection circuit (ICPC) 302, that is coupled to converter 210A. ICPC 302 limits in-rush current to PSU 130A to avoid disruption of the common output bus 260 (FIG. 2) and prevent damage to components of PSU 130A (e.g. bulk capacitor 340) when the PSU is hot swapped or plugged into an active common output bus 260 (FIG. 2). ICPC 302 includes a MOSFET 330, a differentiator 304 and a reverse logic buffer 306. MOSFET 330 has a gate 332, a source 336 and a drain 334. Gate 332 is coupled to node 333 of reverse logic buffer 306. Source 336 is coupled to ground 316, and drain 334 is coupled to one end of capacitor 340. The other end of capacitor 340 is coupled to +Vout terminal 314.

Differentiator 304 includes an operational amplifier (OPAMP) 350 that has a positive supply terminal 356, negative supply terminal 358, positive input signal terminal 354, negative input signal terminal 352 and an output terminal 360. Input terminals 354 and negative supply terminal 358 are coupled to ground. Positive supply terminal 356 is coupled to +Vout terminal 314 or an internal PSU bias source. A resistor 362 is coupled between positive input terminal 352 and output terminal 360. A capacitor 342 is coupled between input terminal 352 and drain 334. Output terminal 360 is further coupled to the anode of diode 372 of reverse logic buffer 306.

Reverse logic buffer 306 includes an NPN transistor 364 having a base 365, an emitter 366 and a collector 367. The base 365 is coupled to one end of resistor 370. The other end of resistor 370 is coupled to the cathode of diode 371. The anode of diode 371 is coupled to the cathode of diode 372. The emitter 366 is coupled to ground. The collector 367 is coupled to node 333. A capacitor 368 is coupled between node 333 and ground. A zener diode 369 is coupled between node 333 and ground. Node 333 is further coupled to the parallel combination of resistor 373 and the anode of diode 374. Resistor 373 and the cathode of diode 374 are coupled to +Vout 314. In another embodiment, resistor 373 and the cathode of diode 374 can be coupled to controller 220A.

When PSU 130A is connected to or plugged into an active power subsystem 125 of IHS 100 which is already powered up, there will be a large in-rush current into capacitor 340. ICPC 302 prevents damage due to the in-rush current. During operation, the output voltage of the differentiator 304 is R362*C342*dV(drain334)/dt, which is also proportional to the current flowing through capacitor 340 which is C340*dV(drain 334)/dt). Because the output terminal 360 of differentiator 304 is coupled to the base 365 of transistor 364, the signal at base 365 is proportional to the in-rush current. If the in-rush current goes beyond a reference value, the output of OPAMP 350 will over-drive transistor 364, pulling the gate voltage of MOSFET 330 down and increasing MOSFET 330 impedance. Because the MOSFET impedance is in series with the capacitor 340, the in-rush current will be reduced. The differentiator 304 controls the gate 332 of MOSFET 330. Diodes 371 and 372 are used to change the operating point of OPAMP 350. While 2 diodes 371 and 372 are shown, more or few diodes could be used.

If the in-rush current is lower than a reference value, the output voltage of OPAMP 304 will be too low, and therefore be unable to drive transistor 364, allowing the gate voltage of MOSFET 330 to increase and the in-rush current to increase. Over a period of time, equilibrium will be reached where the in-rush current causes the proportional reference value voltage and the output of OPAMP 304 to stabilize. The in-rush current reference value voltage is defined by the OPAMP differentiator R362*C342 gain. Resistor 373 is used to slowly charge the gate 332 of MOSFET 330 during start-up. In the beginning, this resistance is necessary to introduce a desired delay between the time that PSU 130A is plugged into the power supply system and MOSFET 330 begin conducting.

Figure 3C:
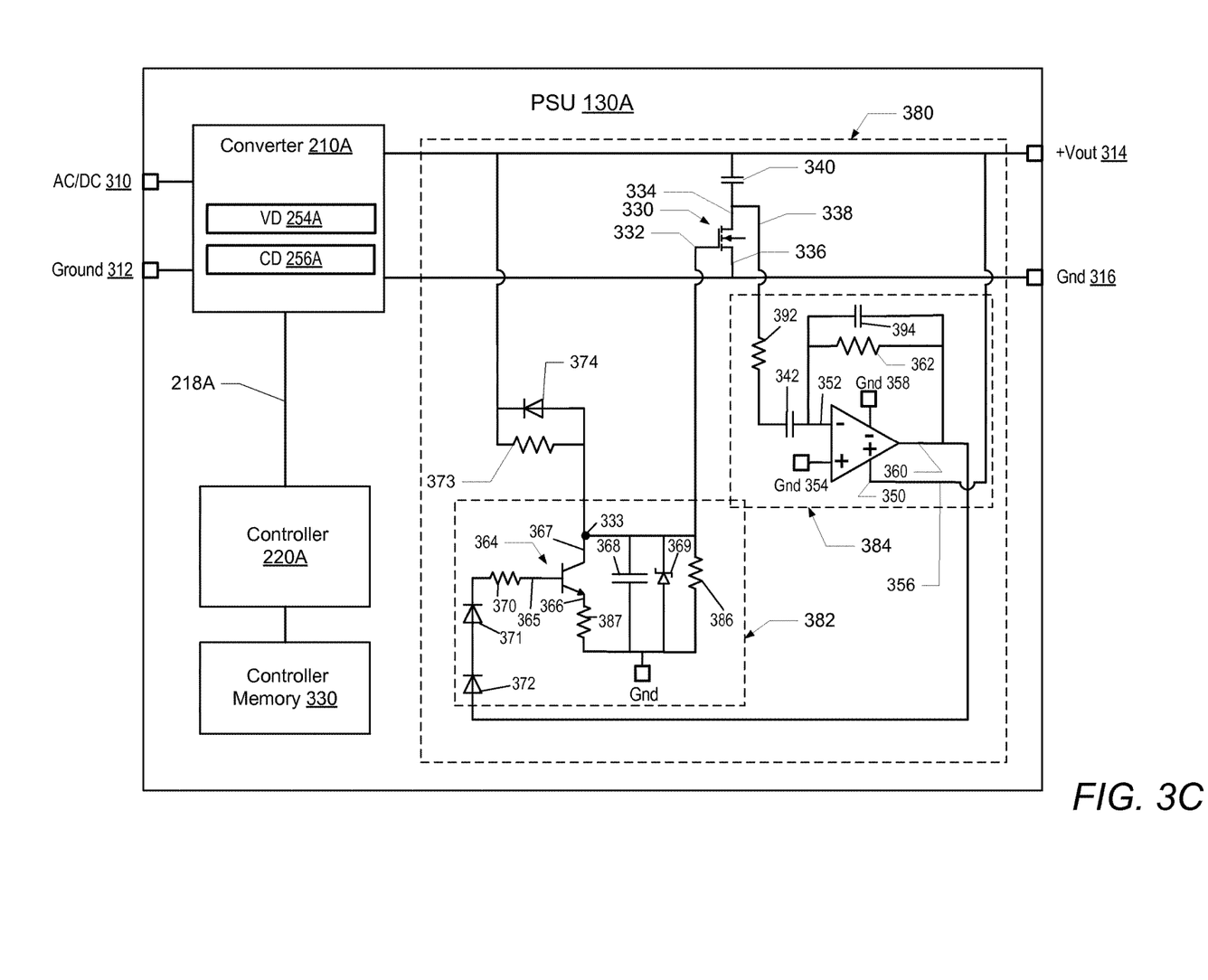
FIG. 3C is a block diagram illustrating details of a power supply unit, including another embodiment of an in-rush current protection circuit, in accordance with one embodiment.

Referring to FIG. 3C, PSU 130A is illustrated including ICPC 380. PSU 130A is the same as previously described for FIG. 3B except that ICPC 380 is slightly different than ICPC 302. ICPC 380 includes reverse logic buffer 382 having an additional resistor 387 coupled between emitter 366 and ground and an additional resistor 386 coupled across diode 369. ICPC 380 further includes differentiator 384 having an additional resistor 392 coupled between drain 334 and capacitor 342 and an additional capacitor 394 coupled across resistor 362. In differentiator 384, the function of the additional resistor 392 and additional capacitor 394 is to filter noise and damp the gain at high frequency.

Figure 4:
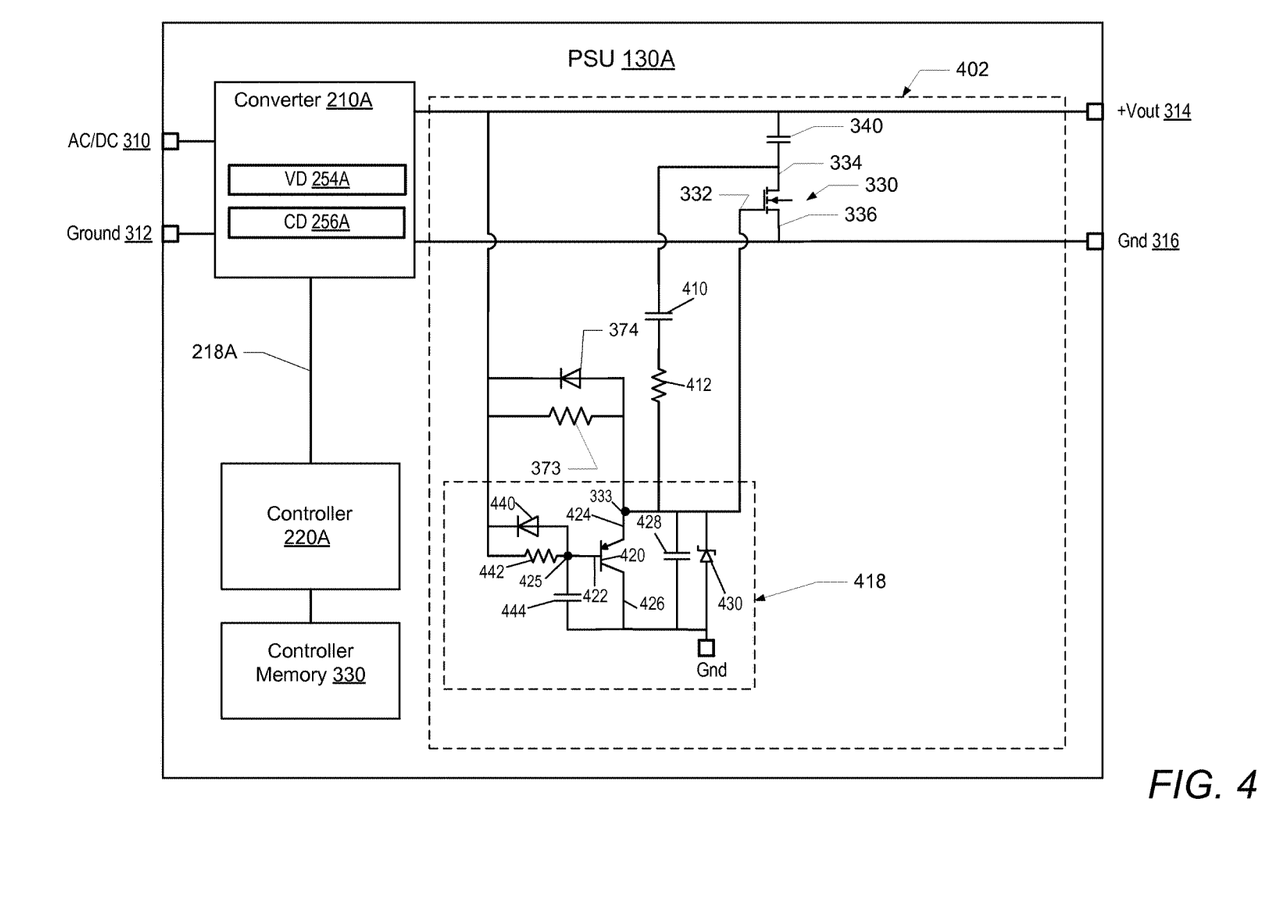
FIG. 4 is a block diagram illustrating details of a power supply unit, including an additional embodiment of an in-rush current protection circuit, in accordance with one embodiment.

FIG. 4, illustrates details of PSU 130A including an additional in-rush current protection circuit embodiment, ICPC 402. PSU 130A includes converter 210A having an input ground terminal 312 and an AC/DC input power terminal 310. Converter 210A further has an output ground terminal 316 and a +Vout terminal 314. The +Vout terminal 314 can supply current to IHS 100. Converter 210A is coupled to controller 220A by internal bus 218A. Converter 210A includes VD 254A and CD 256A. Controller 220A is coupled to controller memory 330. In one embodiment, controller memory 330 can be a non-volatile or flash memory device.

PSU 130A further comprises an ICPC 402, which is coupled to converter 210A. ICPC 402 limits in-rush current to PSU 130A to avoid disruption of the common output bus 260 (FIG. 2) and prevent damage to components of PSU 130A when the PSU is hot swapped or plugged into an active common output bus 260 (FIG. 2). ICPC 402 includes a MOSFET 330 and a clamping circuit 418. MOSFET 330 has a gate 332, a source 336 and a drain 334. Gate 332 is coupled to node 333 of clamping circuit 418. Source 336 is coupled to ground 316, and drain 334 is coupled to one end of capacitor 340. The other end of capacitor 340 is coupled to +Vout terminal 314.

Clamping circuit 418 includes a PNP transistor 420 having a base 422, an emitter 424 and a collector 426. The base 422 is coupled to node 425. The emitter 424 is coupled to node 333, and the collector 426 is coupled to ground. A capacitor 428 is coupled between node 333 and ground. A zener diode 430 is coupled between node 333 and ground. A capacitor 444 is coupled between node 425 and the collector 426. One end of resistor 442 and the anode of diode 440 are coupled to node 425. The other end of resistor 442 and the cathode of diode 440 are coupled to +Vout 314.

ICPC 402 further comprises node 333 coupled to the parallel combination of resistor 373 and the anode of diode 374. Resistor 373 and the cathode of diode 374 are coupled to +Vout 314. In another embodiment, resistor 373 and the cathode of diode 374 can be coupled to controller 220A. The series combination of resistor 412 and capacitor 410 are coupled between node 333 and drain 334.

When PSU 130A including ICPC 402 is plugged into an IHS 100 which is already powered up, there will be a large in-rush current into capacitor 340. ICPC 402 prevents damage by limiting the in-rush current. During operation, the current flowing on capacitor 410 is given by C410*dV(drain)/dt, which is also proportional to the current flowing through capacitor 340. Capacitor 410 allows all the gate charge current from resistor 373 to be diverted to capacitor 410 if the flowing current reaches the reference value. In this case, the gate voltage of MOSFET 330 will remain at a desired value.

If the in-rush current to PSU 130A exceeds the reference value, the current on capacitor 410 will be larger than the current on resistor 373, thereby pulling the gate voltage of MOSFET 330 down and increasing the MOSFET impedance. Because the MOSFET impedance is in series with the capacitor 340 and +Vout 314 (the in-rush current path), the in-rush current will be reduced. If the in-rush current is lower than reference value, the current on capacitor 410 will be less than the current on resistor 373, allowing the gate voltage of MOSFET 330 to increase, and also allowing an increase in in-rush current. Equilibrium is reached when the in-rush current is at a reference value (e.g. 5 A) and the corresponding current on capacitor 410 (e.g. 1 mA) is at the in-rush current reference value as defined by capacitor 410. Transistor 420 is used to clamp the voltage on gate 332 of MOSFET 330 at the moment that PSU 130A is connected to or plugged into an active power subsystem 125.

Figure 5:
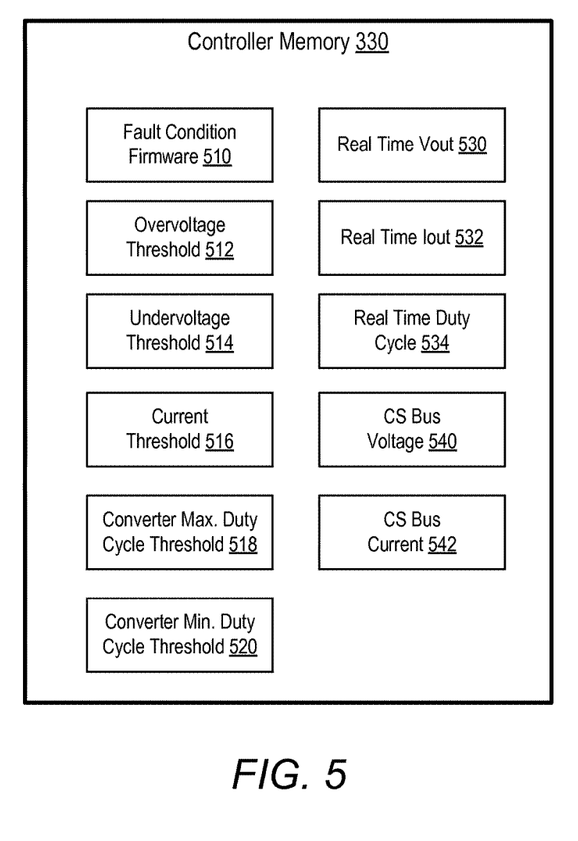
FIG. 5 is a block diagram illustrating example contents of the controller memory, in accordance with one embodiment.

FIG. 5 illustrates detail of the contents of controller memory 330. The description of FIG. 5 is made with general reference to the specific components illustrated within the preceding FIGS. 1-4. With specific reference to FIG. 5, controller memory 330 stores fault condition firmware 510. Fault condition firmware 510 executes on each of controllers 220A-C and can configure a corresponding controller 220 to determine, for each of PSUs 130A-C, if the PSU is defective or has a fault condition. And, if the PSU is defective, the fault condition firmware 510 can configure the controller 220 to disable the PSU, such that the PSU does not provide power to the power supply system. Controller memory 330 further stores an overvoltage threshold 512, an undervoltage threshold 514, a current threshold 516, a converter maximum duty cycle threshold 518 and a converter minimum duty cycle threshold 520. The converter maximum duty cycle threshold 518 and minimum duty cycle threshold 520 are the maximum and minimum pulse width modulation (PWM) operating frequencies for switches internal to converter 210A.

Controller memory 330 further can store the measured real time voltage, Vout 530 received from VD 254A, the measured real time current, Iout 532, received from CD 256A and the real time duty cycle 534 received from converter 210A. Controller memory 330 further stores CS bus voltage 540 sensed from CS bus 250 and the CS bus current 542 calculated by controller 220A from the CS bus voltage 540. CS bus current 542 is proportional to the voltage on CS bus 250. Controller 220A can calculate CS bus current 542 from CS bus voltage 540.

Figure 6:
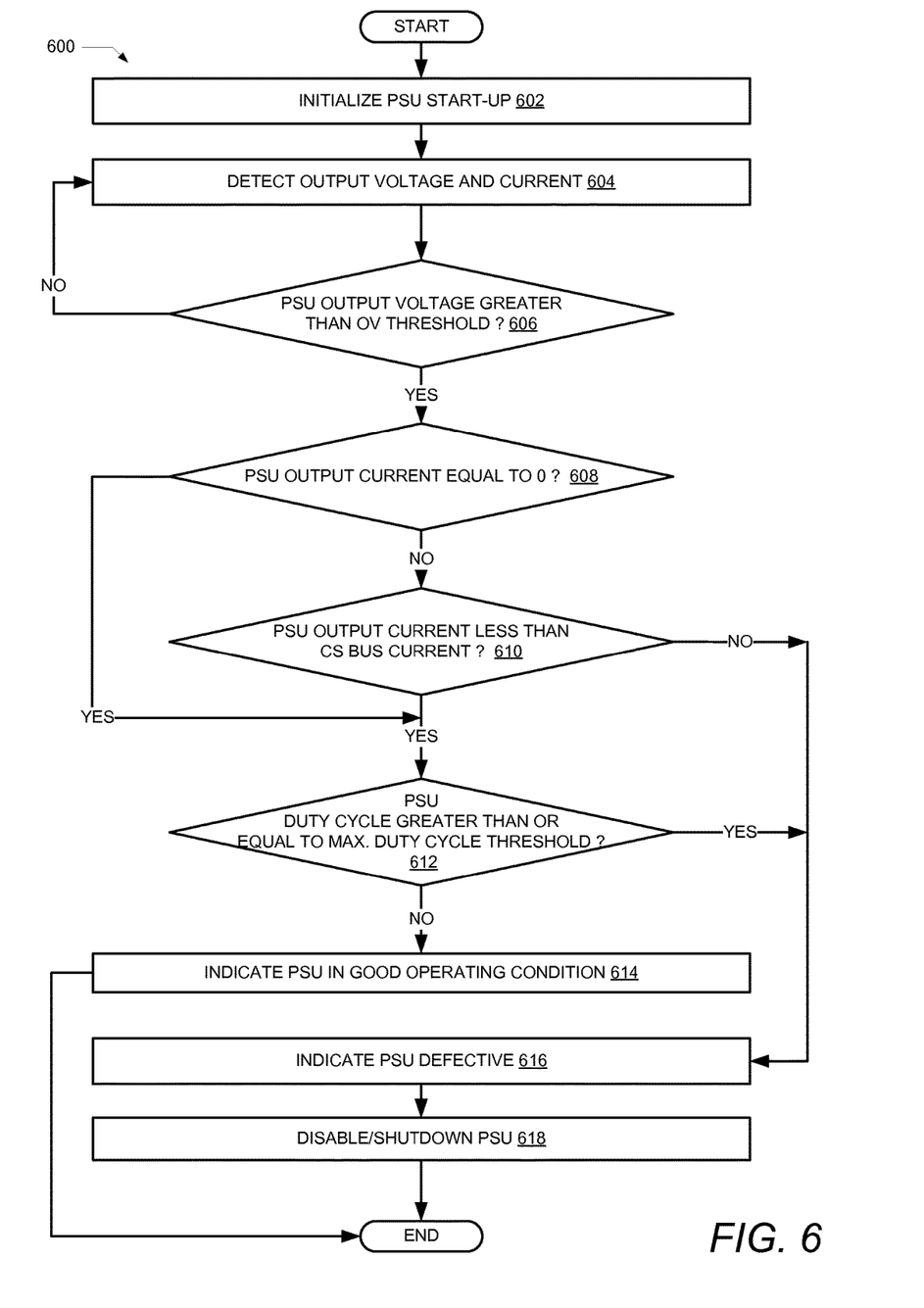
FIG. 6 is a flow chart illustrating one example of the method by which a controller determines if a power supply unit is functioning properly in an IHS, according to one or more embodiments.
Figure 7:
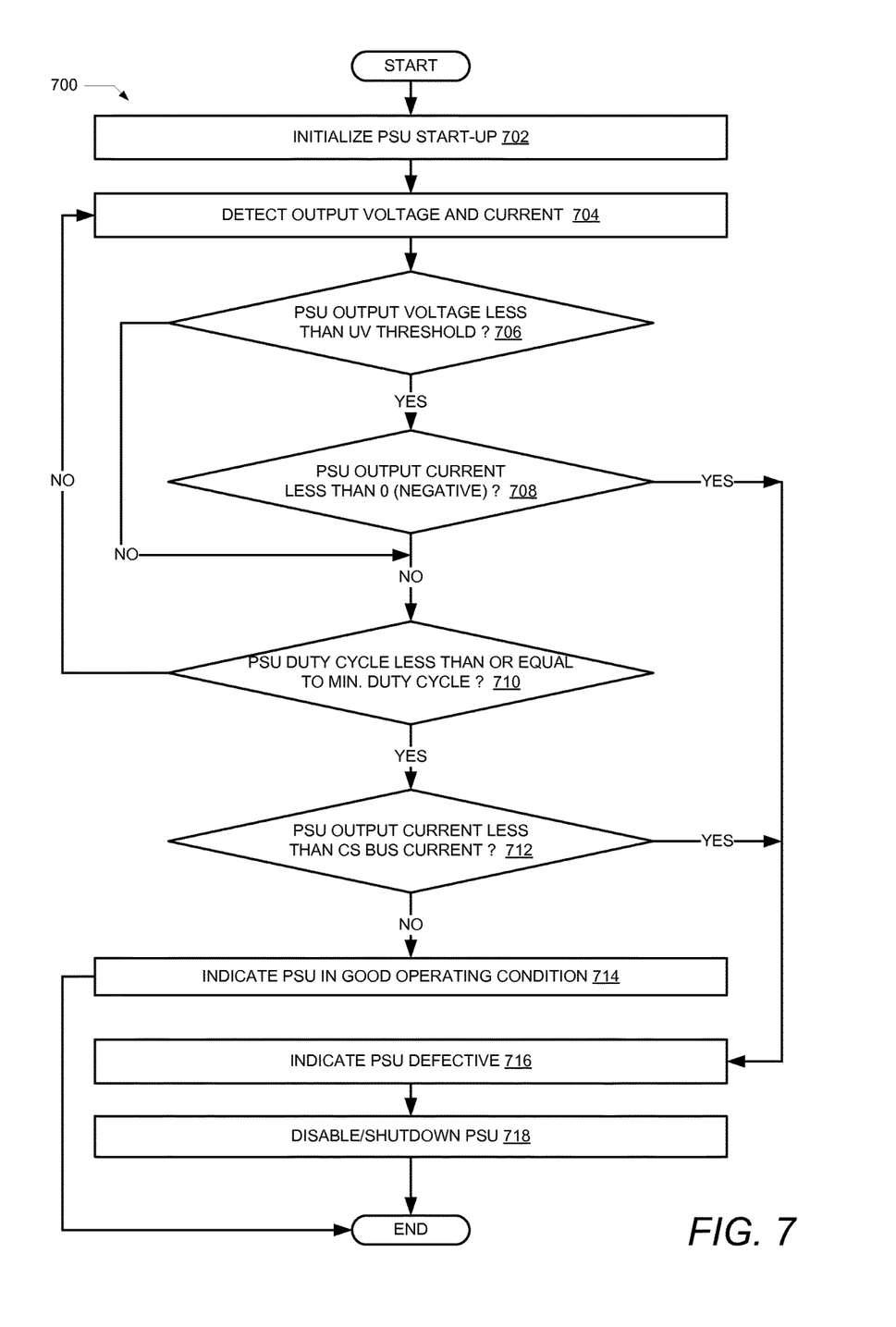
FIG. 7 is a flow chart illustrating another example of the method by which a controller determines if a power supply unit is functioning properly in an IHS, according to one or more embodiments.

FIGS. 6 and 7 illustrate flowcharts of exemplary methods 600 and 700 by which Controllers 220A-C within the preceding figures performs different aspects of the processes that enable the one or more embodiments of the disclosure. The description of methods 600 and 700 are provided with general reference to the specific components illustrated within the preceding FIGS. 1-5. Methods 600 and 700 are described as being implemented via controller 220A and particularly the execution of code provided by fault condition firmware 510 within controller 220A. It is however appreciated that certain aspects of the described methods may be implemented via other processing devices and/or execution of other code.

With specific reference to FIG. 6, method 600 begins at the start block and proceeds to block 602 where controller 220A initializes PSU 130A during start-up, including providing a signal via D/A 232A to the common hardware bus 250 and providing an output voltage and current to +Vout terminal 314. Controller 220A detects or receives the real time measured output voltage 530 from VD 254A and the real time measured output current 532 from CD 256A via A/D 230A (block 604). In one embodiment, controller 220A also stores the real time measured output voltage 530 and the real time measured output current 532 to controller memory 330 at block 604.

Controller 220A determines if the real time measured output voltage 530 is greater than the overvoltage threshold 512 by comparing the real time measured output voltage 530 to the overvoltage threshold 512 (decision block 606). In response to the real time measured output voltage 530 not being greater than the overvoltage threshold 512, controller 220A continues to detect or receive the real time measured output voltage from VD 254A and the real time measured output current from CD 256A via A/D 230A at block 604.

In response to the real time measured output voltage 530 being greater than the overvoltage threshold 512, controller 220A determines if the real time measured output current 532 is equal to zero (or a near-zero value within a predetermined threshold) (decision block 608). In response to the real time measured output current 532 not being equal to zero, the algorithm moves to block 610, which determines if the PSU output current is less than the CS bus current 542. In response to the real time measured output current 532 not being less than the calculated CS bus current 542, controller 220A indicates that PSU 130A is defective by transmitting a signal to MC 110 via communication bus 134 (block 616) and controller 220A disables or shuts down PSU 130A by transmitting a signal to converter 210A via internal bus 218A (block 618). Method 600 then terminates.

In response to the real time measured output current 532 being equal to zero (or a near-zero value within a predetermined threshold), the algorithm proceeds to decision block 612, which determines if the PSU duty cycle equates to or is equal to a maximum value or threshold.

In response to the real time measured output current 532 being equal to zero or being less than the calculated CS bus current 542, controller 220A determines if the real time duty cycle 534 of converter 210A is greater than or equal to the defined converter maximum duty cycle threshold 518 (decision block 612). In response to the real time duty cycle 534 of converter 210A being greater than or equal to the converter maximum duty cycle threshold 518, controller 220A indicates that PSU 130A is defective by transmitting a signal to MC 110 via communication bus 134 (block 616), and disables or shuts down PSU 130A by transmitting a signal to converter 210A via internal bus 218A (block 618). Method 600 then ends.

In response to the real time duty cycle 534 of converter 210A not being greater than or equal to the converter maximum duty cycle threshold 518, controller 220A indicates that PSU 130A is in good operating condition by transmitting a signal to MC 110 via communication bus 134 (block 614). Method 600 then terminates.

Turning to FIG. 7, method 700 begins at the start block and proceeds to block 702 where controller 220A initializes PSU 130A during start-up, including providing a signal via D/A 232A to the common hardware bus 250 and providing an output voltage and current to +Vout terminal 314. Controller 220A detects or receives the real time measured output voltage 530 from VD 254A and the real time measured output current 532 from CD 256A via A/D 230A (block 704). In one embodiment, controller 220A also stores the real time measured output voltage 530 and the real time measured output current 532 to controller memory 330 at block 604.

Controller 220A determines if the real time measured output voltage 530 is less than the undervoltage threshold 514 by comparing the real time measured output voltage 530 to the undervoltage threshold 514 (decision block 706). In response to the real time measured output voltage 530 not being less than the undervoltage threshold 514, method 700 proceeds to decision block 710.

In response to the real time measured output voltage 530 being less than the undervoltage threshold 514, controller 220A determines if the real time measured output current 532 is less than zero (decision block 708). A less than zero current denotes relative current direction, whereas a negative current reflects the PSU sinking current from common output bus 260. In response to the real time measured output current 532 being less than zero, controller 220A indicates that PSU 130A is defective by transmitting a signal to MC 110 via communication bus 134 (block 716) and disables or shuts down PSU 130A by transmitting a signal to converter 210A via internal bus 218A (block 718). Method 700 then ends.

In response to the real time measured output voltage 530 not being less than the undervoltage threshold 514 (decision block 706) and in response to the real time measured output current 532 not being less than zero, controller 220A determines if the real time duty cycle 534 of converter 210A is less than or equal to the converter minimum duty cycle threshold 520 (decision block 710). In response to the real time duty cycle 534 of converter 210A not being less than or equal to the converter minimum duty cycle threshold 520, controller 220A continues to detect or receive the real time measured output voltage from VD 254A and the real time measured output current from CD 256A via A/D 230A at block 704.

In response to the real time duty cycle 534 of converter 210A being equal to or less than the converter minimum duty cycle threshold 520, controller 220A determines if the real time measured output current 532 is less than the calculated CS bus current 542 (decision block 712). In response to the real time measured output current 532 being less than the calculated CS bus current 542, controller 220A indicates that PSU 130A is defective by transmitting a signal to MC 110 via communication bus 134 (block 716), and controller 220A disables or shuts down PSU 130A by transmitting a signal to converter 210A via internal bus 218A (block 718). Method 700 then terminates.

In response to the real time measured output current 532 not being less than the calculated CS bus current 542, controller 220A indicates that PSU 130A is in good operating condition by transmitting a signal to MC 110 via communication bus 134 (block 714). Method 600 then ends.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of detecting and disabling a failed power supply in a redundant power supply system, the method comprising:
   detecting, via a first controller, an output voltage and an output current of a first power supply providing power to the redundant power supply system;
   determining if the output voltage is greater than a maximum output voltage threshold;

in response to determining that the output voltage is greater than the maximum output voltage threshold, determining if the output current is equal to zero;
in response to determining that the output current is not equal to zero and not less than a common share bus current on a shared output bus, disabling the first power supply such that the first power supply does not provide power to the power supply system; and
limiting, via an in-rush current protection circuit, an in-rush current to the first power supply when the first power supply is connected to the shared output bus, wherein the in-rush current protection circuit comprises: a first switch coupled to an output of the first converter; a reverse logic buffer circuit coupled to the first switch; and a differentiator circuit coupled between the reverse logic buffer circuit and the first switch.

2. The method of claim 1, further comprising:
in response to determining that the output current is equal to zero, determining if a converter duty cycle is greater than or equal to the maximum converter duty cycle threshold, wherein the converter duty cycle is associated with a first converter of the first power supply; and
in response to determining that the converter duty cycle is greater than or equal to the maximum converter duty cycle threshold, disabling the first power supply such that the first power supply does not provide power to the power supply system.

3. The method of claim 1, further comprising:
in response to determining that the output current is less than the common share bus current, determining if a converter duty cycle is greater than or equal to the maximum converter duty cycle threshold, wherein the converter duty cycle is associated with a first converter of the first power supply; and
in response to determining that the converter duty cycle is greater than or equal to the maximum converter duty cycle threshold, disabling the first power supply such that the first power supply does not provide power to the power supply system.

4. The method of claim 1, further comprising:
determining if the output voltage is less than a minimum output voltage threshold;
in response to determining that the output voltage is less than the minimum output voltage threshold, determining if the output current is less than zero; and
in response to determining that the output current is less than zero, disabling the first power supply such that the first power supply does not provide power to the power supply system.

5. The method of claim 4, further comprising:
in response to determining that the output current is not less than zero, determining if a converter duty cycle is greater than a minimum converter duty cycle threshold, wherein the converter duty cycle is associated with a first converter of the first power supply; and
in response to determining that the converter duty cycle is less than or equal to the minimum converter duty cycle threshold, determining if the output current is less than a first current associated with a common share bus voltage; and
in response to determining that the output current is less than the first current, disabling the first power supply such that the first power supply does not provide power to the power supply system.

6. A power supply system comprising:
a first power supply including a first converter communicatively coupled to a first controller;
a second power supply including a second converter communicatively coupled to a second controller, the first power supply and the second power supply connected via a shared output bus in a redundant power supply configuration;
a voltage detector that detects an output voltage of the first power supply;
a current detector that detects an output current of the first power supply;
a storage device associated with the first controller that includes firmware that enables control of the first power supply, wherein the firmware is executed by the first controller and configures the first controller to:
receive the output voltage and the output current;
determine if the output voltage is greater than a maximum output voltage threshold;
in response to determining that the output voltage is greater than the maximum output voltage threshold, determine if the output current is equal to zero; and
in response to determining that the output current is not equal to zero and not less than a common share bus current, disable the first power supply such that the first power supply does not provide power to the power supply system; and
an in-rush current protection circuit coupled to the first converter comprising:
a first switch coupled to an output of the first converter;
a reverse logic buffer circuit coupled to the first switch; and
a differentiator circuit coupled between the reverse logic buffer circuit and the first switch.

7. The power supply system of claim 6, wherein the firmware further configures the first controller to:
in response to determining that the output current is equal to zero, determine if a converter duty cycle is greater than or equal to the maximum converter duty cycle threshold, wherein the converter duty cycle is associated with a first converter of the first power supply; and
in response to determining that the converter duty cycle is greater than or equal to the maximum converter duty cycle threshold, disable the first power supply such that the first power supply does not provide power to the power supply system.

8. The power supply system of claim 6, wherein the firmware further configures the first controller to:
in response to determining that the output current is less than the common share bus current, determine if a converter duty cycle is greater than or equal to a maximum converter duty cycle threshold, wherein the converter duty cycle is associated with the first converter of the first power supply; and
in response to determining that the converter duty cycle is greater than or equal to the maximum converter duty cycle threshold, disable the first power supply such that the first power supply does not provide power to the power supply system.

9. The power supply system of claim 6, wherein the firmware further configures the first controller to:
determine if the output voltage is less than a minimum output voltage threshold;
in response to determining that the output voltage is less than the minimum output voltage threshold, determine if the output current is less than zero; and
in response to determining that the output current is less than zero, disable the first power supply such that the first power supply does not provide power to the power supply system.

10. The power supply system of claim 9, wherein the firmware further configures the first controller to:
  in response to determining that the output current is not less than zero, determine if a converter duty cycle is greater than a minimum converter duty cycle threshold, wherein the converter duty cycle is associated with the first converter of the first power supply; and
  in response to determining that the converter duty cycle is less than or equal to the minimum converter duty cycle threshold, determine if the output current is less than a first current associated with a common share bus voltage; and
  in response to determining that the output current is less than the first current, disable the first power supply such that the first power supply does not provide power to the power supply system.

11. The power supply system of claim 6, wherein the in-rush current protection circuit limits in-rush current to the first power supply when the first power supply is connected to the shared output bus.

12. The power supply system of claim 11, wherein the in-rush current protection circuit further comprises:
  a first switch coupled to an output of the first converter;
  a clamping circuit coupled to the first switch; and
  a resistor-capacitor circuit coupled between the clamping circuit and the first switch.

13. An information handling system (IHS) comprising:
  at least one processing node, the processing node having at least one central processing unit (CPU);
  a first power supply including a first converter communicatively coupled to a first controller;
  a second power supply including a second converter communicatively coupled to a second controller, the first power supply and the second power supply connected via a shared output bus in a redundant power supply configuration;
  a voltage detector that detects an output voltage of the first power supply;
  a current detector that detects an output current of the first power supply;
  a storage device associated with the first controller that includes firmware that enables control of the first power supply, wherein the firmware is executed by the first controller and configures the first controller to:
  receive the output voltage and the output current;
  determine if the output voltage is greater than a maximum output voltage threshold;
  in response to determining that the output voltage is greater than the maximum output voltage threshold, determine if the output current is equal to zero; and
  in response to determining that the output current is not equal to zero and not less than a common share bus current, disable the first power supply such that the first power supply does not provide power to the power supply system; and
  an in-rush current protection circuit coupled to the first converter, the in-rush current protection circuit limiting in-rush current to the first power supply when the first power supply is connected to the shared output bus, wherein the in-rush current protection circuit comprises:
    a first switch coupled to an output of the first converter;
    a reverse logic buffer circuit coupled to the first switch; and
    a differentiator circuit coupled between the reverse logic buffer circuit and the first switch.

14. The information handling system of claim 13, wherein the firmware further configures the first controller to:
  in response to determining that the output current is equal to zero, determine if a converter duty cycle is greater than or equal to the maximum converter duty cycle threshold, wherein the converter duty cycle is associated with a first converter of the first power supply; and
  in response to determining that the converter duty cycle is greater than or equal to the maximum converter duty cycle threshold, disable the first power supply such that the first power supply does not provide power to the power supply system.

15. The information handling system of claim 13, wherein the firmware further configures the first controller to:
  in response to determining that the output current is less than the common share bus current, determine if a converter duty cycle is greater than or equal to the maximum converter duty cycle threshold, wherein the converter duty cycle is associated with the first converter of the first power supply; and
  in response to determining that the converter duty cycle is greater than or equal to the maximum converter duty cycle threshold, disable the first power supply such that the first power supply does not provide power to the power supply system.

16. The information handling system of claim 13, wherein the firmware further configures the first controller to:
  determine if the output voltage is less than a minimum output voltage threshold;
  in response to determining that the output voltage is less than the minimum output voltage threshold, determine if the output current is less than zero; and
  in response to determining that the output current is less than zero, disable the first power supply such that the first power supply does not provide power to the power supply system.

17. The information handling system of claim 16, wherein the firmware further configures the first controller to:
  in response to determining that the output current is not less than zero, determine if a converter duty cycle is greater than or equal to the minimum converter duty cycle threshold, wherein the converter duty cycle is associated with the first converter of the first power supply; and
  in response to determining that the converter duty cycle is less than or equal to the minimum converter duty cycle threshold, determine if the output current is less than a first current associated with a common share bus voltage; and
  in response to determining that the output current is less than the first current, disable the first power supply such that the first power supply does not provide power to the power supply system.

18. The information handling system of claim 13, further comprising:
  an in-rush current protection circuit coupled to the first converter, the in-rush current protection circuit limiting in-rush current to the first power supply when the first power supply is connected to the shared output bus, wherein the in-rush current protection circuit further comprises:
    a first switch coupled to an output of the first converter;
    a clamping circuit coupled to the first switch; and
    a resistor-capacitor circuit coupled between the clamping circuit and the first switch.

* * * * *